United States Patent [19]

Lairloup

[11] 4,451,310
[45] May 29, 1984

[54] PREPARATION OF LIGHTWEIGHT, INSULATING AND SEMIRIGID OR RIGID ELEMENTS

[75] Inventor: Jean-Claude Lairloup, Brionne, France

[73] Assignee: Nobel-Bozel, Puteaux, France

[21] Appl. No.: 367,131

[22] Filed: Apr. 9, 1982

[30] Foreign Application Priority Data

Apr. 14, 1981 [FR] France ................... 81 07466

[51] Int. Cl.$^3$ ............................................... B32B 5/18
[52] U.S. Cl. ...................................... 156/78; 264/321
[58] Field of Search ................... 264/321; 428/304.4; 521/52; 156/78, 79

[56] References Cited

U.S. PATENT DOCUMENTS 3,269,887  8/1966  Windecker ................. 428/413
3,298,857  1/1967  Terry ........................ 117/58
3,944,704  3/1976  Dirks ........................ 264/321

FOREIGN PATENT DOCUMENTS 224935   6/1957  Australia ................. 521/52
1200322  3/1967  United Kingdom ....... 521/52

Primary Examiner—Donald E. Czaja
Assistant Examiner—Mary A. Becker
Attorney, Agent, or Firm—Karl W. Flocks; Sheridan Neimark

[57] ABSTRACT

A process for preparing light-weight, insulating and semi-rigid or rigid elements, essentially comprises impregnating a porous supple material having an internal structure with preferentially open cells, with the desired quantity of a solution of a compound selected from the group comprising isocyanates, and having consequently in its formula at least a —NCO group, the material optionally having the final shape which is to be obtained, then proceeding with reticulation of the compound after reacting it with water giving a derivative of urea or biuret.

13 Claims, 1 Drawing Figure

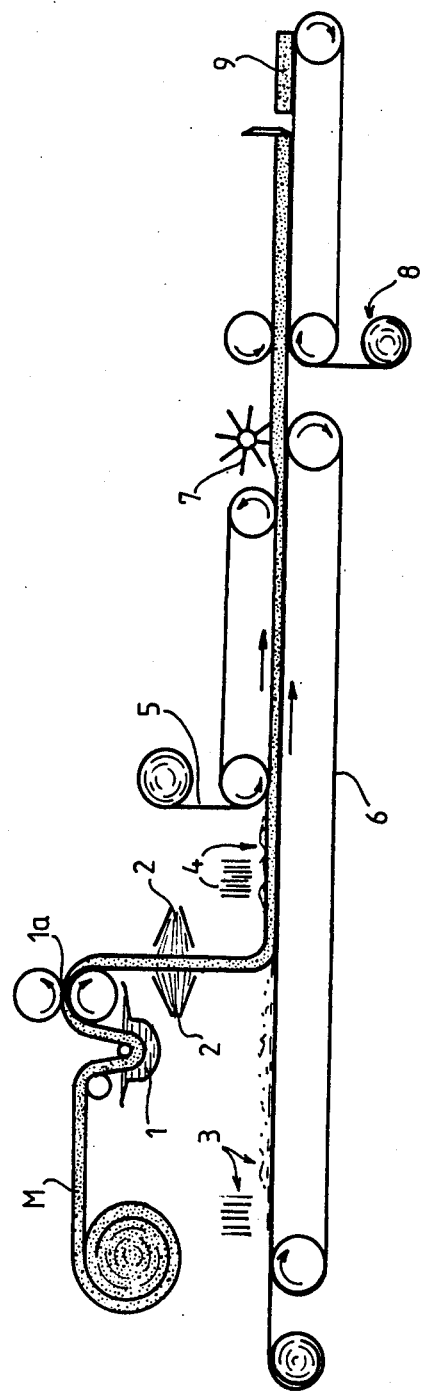

PREPARATION OF LIGHTWEIGHT, INSULATING AND SEMIRIGID OR RIGID ELEMENTS

The present invention relates to a process for preparing of lightweight insulating, and semi-rigid or rigid elements, and resulting elements, well as to the elements resulting from such process.

Such elements are panels or parts of variable shapes and thicknesses. Thus, this definition comprises self-carrying elements such as the roof panels, instrument boards, and tablets, linings of car bodies and the like, used in the automobile industry, but these examples have no limitative character.

A great number of processes for obtaining such elements are known. However, when the known technologies are implemented, either the resulting elements do not meet certain conditions such as e.g. density, and/or rigidity, and/or suppleness, and/or steadiness and/or mechanical strength and/or thermal stability, and/or stability and the like, thereby implying that for obtaining the desired result (s), the process of preparation must be influenced either during the operational steps, or relative to the operative conditions, and/or the nature of the compounds, compositions, and materials used, or the processes are relatively complex and/or little economical, when they are used to obtain finished elements possessing well defined properties and characteristics.

The invention now solves both types of difficulties by a simple and economical process which provides as desired under the same operational conditions, a complete range of finished products from the supple to the rigid ones, inclusive of the half-supple and the half-rigid.

The process according to the invention consists of impregnating a porous supple material having an internal structure with preferably open cells, with the desired quantity of a solution of a compound selected from the group comprising isocyanates and having consequently at least one —NCO group in its formula, said material having already or not having the final shape which is to be obtained, then proceeding with reticulation of said compound after reacting it with water, producing a derivative of urea or biuret.

There can be cited, as examples of compounds belonging to the isocyanate group, the isocyanates themselves (pure or raw) such as TDI (toluene di-isocyanate) or MDI (4-4'-diphenylmethane di-isocyanate), the polymers of isocyanates still containing at least one terminal —NCO group, and generally, any compounds having at least one —NCO termination in their molecule.

According to an advantageous form of embodiment, the desired quantity of the solution of the isocyanate compound is obtained by expressing if need be any quantity of liquid in excess of said desired quantity, from the totally impregnated porous material.

Similarly, as regards shape to be given to the desired final element, if the basic element is not already of the required shape, it is obtained before or during reticulation through die-shaping, stamping, rolling, calendering. moulding, and like operations.

The process according to the invention makes it possible to realize supple, half-supple, rigid or half-rigid elements depending on the isocyanate compound used for the impregnation, with unchanged conditions of implementation. As a matter of fact, the reactions of the isocyanate radicals upon water are known, leading to derivatives of urea and biuret, which are the more reticulated, the more the starting compounds contain —NCO radicals. This would explain the variety of properties determining suppleness or rigidity that can thus be obtained.

According to one mode of implementation which is interesting for obtaining such elements having a modified surface aspect starting from the initial aspect, the impregnation step is followed or accompanied by a coating step consisting of depositing on one or both of the faces of the starting element, a fibrous material with distinct fibers, admitted as separated fibers (short or long) of layers or mats of fibers, with such fibers being of natural or synthetic, organic or mineral origin, such as glass fibers, animal or vegetal fibers, synthetic fibers, and said isocyanate compound being then used as a bonding or embedding agent for such fibers.

It will be easily understood that such an implementation mode is interesting because the isocyanate compound is both the impregnation agent of the cells and the surfaces of the starting porous material element, the bonding agent (at the interfaces) between the fibers and said element, on the one hand, and on the other hand, between the fibers themselves, and the embedding agent for the fibers, the assembly thus realized after reticulation constituting a coherent assembly in which the fibers used intimately belong to the porous element by being embedded and incorporated therein and also constitute the superficial layer which is made integral with the surface of said porous element by intimately belonging thereto.

Similarly, the aspect of the surfaces may still be modified by providing a coating material of continuous texture such as sheets of paper, cardboard, layers, webs, fabrics, films or pellicles of plastics materials, and the like, said isocyanate compound also serving as a bonding agent.

It will be understood that the reticulation reaction can be activated, accelerated, or else modified as it is known in itself, by adding catalysts or other accelerators thereto, and/or by heating.

The following example is given in an illustrative not at all limitative manner, in reference to the attached diagram showing a possible implementation of the process according to this invention.

Porous element used (or foam): layer of cellular polyether of a density of 14 kg/m$^3$, and a thickness of 7 mm;
Isocyanate: MDI (4-4'-diphenylmethane di-isocyanate) in a chlorinated solvent (50/50 by weight);
Glass fibers of a length of 2 cm;
Polyethylene sheet of 25 g/m$^2$;
Coatings:
  on one face: unweft of 200 g/m$^2$,
  on the other face: unweft of 50 g/m$^2$.

The foam (M) is impregnated (at 1) by slop-padding in the MDI/solvent mixture, followed by drying out (at 1a). The setting of the dry out rate is calculated so as to obtain a material weighing 650 g/m$^2$. During the dry out step, the foam, due to its swelling, weighs from 98 g/m$^2$ to 70 g/m$^2$, and contains 292 g/m$^2$ of MDI and 292 g of solvent.

At the exit from the dry out station, water spraying (advantageously, aminated —20 g/liter of dimethylamine) is effected (at 2) on both faces of the foam.

The so treated foam deposits on a polyethylene film on which 70 g of cut and intermixed glass fibers have been deposited (at 3). The same deposition step with 70 g of glass fibers is effected (at 4) on the opposite face of the foam.

A second polyethylene film is deposited (by the assembly 5) on said glass fibers.

The so created complex is compressed e.g. by a double conveyor, as schematized at 6, in such manner that the MDI/solvent mixture in excess in the foam embeds the glass fibers. At the exit from the conveyor, hedgehog means 7 perforates the polyethylene to permit the foam to recover its initial thickness.

At this stage, there is provided (at 8) for application of outer coatings and then, through cutting, (at 9), the dimensions of the blank necessary later are obtained.

The complex is then placed e.g. between a male and female dies (not shown) faithfully reproducing the configuration of the final element to be made, then is heated to a temperature to permit melting of the polyethylene. The reticulation period is less than 90 seconds.

The polyethylene supplies in melting complementary bonding between the different elements.

The obtained element weighs 800 g/m² and is rigid.

According to the same mode of implementation, a supple or half-rigid element is made by selecting the appropriate —NCO termination isocyanate.

Similarly, for low temperature applications, the polyethylene can be replaced by any other non porous support to prevent migration of MDI and the basic element (M) can adhere thereto.

The MDI/solvent mixture can be admixed with catalysts, silicone and other additives, which only influence the reticulation times.

The elements produced in accordance with the process of the invention have the advantage of showing very good temperature and humid phase stability, due to the reticulation reaction resulting in temperature irreversible and water insoluble products.

It will be understood that the present invention was only described in a purely explanatory and not limitative manner and that any useful modifications can be made thereto without departing from its scope as defined in the appended claims.

I claim:

1. A process for preparing lightweight, insulating and semi-rigid or rigid elements, of the type including panels or parts of variable shapes or thicknesses comprising
impregnating a supple porous material having an inner structure with open cells, with a desired quantity of an isocyanate compound having at least one —NCO group,
then contacting said isocyanate impregnated supple porous material with water, whereby said water and said isocyanate begin to react, the reaction giving a derivative of urea or biuret,
then accelerating the reaction of said isocyanate compound with water by heating, and shaping under pressure the impregnated porous material to provide its final shape.

2. A continuous process according to claim 1, wherein said heating and said shaping are carried out simultaneously.

3. A process according to claim 1, wherein, following said impregnation of said supple porous material with said isocyanate and before said contact with water, excess isocyanate beyond the desired quantity is expressed from said impregnated supple porous material.

4. A process according to claim 1, wherein said isocyanate compound is impregnated into said supple porous material in the form of a solution.

5. A process according to claim 1, wherein said porous supple material is open cell polyether foam.

6. A process according to claim 1, wherein said shaping forms the impregnated material into an automobile roof panel.

7. A process according to claim 1, wherein said shaping is effected between male and female dies.

8. A process according to claim 1, wherein, after said contact with water to initiate said reaction, fibrous material with distinct fibers is deposited, on one or both faces of the porous element, and said isocyanate compound further serves as a bonding or embedding agent for said fibers.

9. A process according to claim 8, wherein a plastic film is fed over said fibers and is united thereto, said isocyanate compound serving as a bonding agent.

10. A process according to claim 9, wherein unweft fabrics are applied to the two faces of the resultant product after application of the plastic film and before said pressing.

11. A process according to claim 1, wherein said isocyanate compound is admixed with an accelerator for increasing the rate of said reaction.

12. A process according to claim 1, wherein said isocyanate compound has mixed therewith an amine.

13. A process according to claim 1, wherein said isocyanate compound has mixed therewith a silicone material.

* * * * *